(12) United States Patent
Sorensen et al.

(10) Patent No.: US 7,861,630 B2  
(45) Date of Patent: Jan. 4, 2011

(54) METHOD AND APPARATUS FOR PORTION CUTTING OF FOOD PRODUCTS OR SIMILAR ITEMS

(75) Inventors: Gorm Sorensen, Aakirkeby (DK); Peter Mikkelsen, Svaneke (DK); Mikael Krogh, Skodstrup (DK)

(73) Assignee: Scanvaegt International A/S, Arhus N (DK)

( * ) Notice: Subject to any disclaimer, the term of this patent is extended or adjusted under 35 U.S.C. 154(b) by 265 days.

(21) Appl. No.: 10/598,155

(22) PCT Filed: Feb. 17, 2005

(86) PCT No.: PCT/DK2005/000103
§ 371 (c)(1),
(2), (4) Date: Sep. 21, 2006

(87) PCT Pub. No.: WO2005/079588
PCT Pub. Date: Sep. 1, 2005

(65) Prior Publication Data
US 2007/0157776 A1 Jul. 12, 2007

(30) Foreign Application Priority Data
Feb. 20, 2004 (DK) ................................ 2004 00269

(51) Int. Cl.
*B26D 5/34* (2006.01)
(52) U.S. Cl. ................................ 83/42; 83/363; 83/364

(58) Field of Classification Search ........... 83/363–365, 83/703, 932, 42; 700/57–59, 117, 124, 125, 700/159, 171, 175
See application file for complete search history.

(56) References Cited

U.S. PATENT DOCUMENTS 4,557,019 A * 12/1985 Van Devanter et al. ....... 452/157
4,572,044 A * 2/1986 Antonissen .................... 83/42

(Continued)

FOREIGN PATENT DOCUMENTS

JP 59151007 A * 8/1984

(Continued)

OTHER PUBLICATIONS

International Search Report dated Jan. 6, 2005.

*Primary Examiner*—Kenneth E. Peterson
*Assistant Examiner*—Sean Michalski
(74) *Attorney, Agent, or Firm*—Pearne & Gordon LLP

(57) ABSTRACT

A method and an apparatus for increasing the capacity and precision of a portion cutter wherein the items to be portion cut are positioned abutting each other. In particular are provided a method and apparatus for identifying a boundary between consecutive items to be cut when the items are placed on a conveyor abutting each other with little or no gab between the items. At least one characteristic is measured for each of the items, and at least one process parameter is controlled in order to achieve predetermined product portions from the items based on the measured characteristic.

48 Claims, 5 Drawing Sheets

U.S. PATENT DOCUMENTS

| | | | | |
|---|---|---|---|---|
| 4,962,568 | A | * | 10/1990 | Rudy et al. .................. 452/157 |
| 5,129,298 | A | * | 7/1992 | Cresson et al. ................. 83/72 |
| 5,267,168 | A | * | 11/1993 | Antonissen et al. ......... 700/117 |
| 5,352,153 | A | * | 10/1994 | Burch et al. ................ 452/157 |
| 5,481,466 | A | * | 1/1996 | Carey ......................... 700/167 |
| 5,702,295 | A | * | 12/1997 | Ketels ........................ 452/180 |
| 5,784,937 | A | * | 7/1998 | Wygal et al. ................. 83/422 |
| 6,279,022 | B1 | * | 8/2001 | Chen .......................... 708/404 |
| 6,865,800 | B2 | * | 3/2005 | Utecht et al. .................. 29/711 |
| 6,882,434 | B1 | * | 4/2005 | Sandberg et al. ............ 356/601 |
| 7,519,206 | B2 | * | 4/2009 | Mulet-Parada et al. ...... 382/128 |

FOREIGN PATENT DOCUMENTS

WO      WO 9947885 A2 * 9/1999

\* cited by examiner

METHOD AND APPARATUS FOR PORTION CUTTING OF FOOD PRODUCTS OR SIMILAR ITEMS

This patent application claims priority from prior PCT application No. PCT/DK2005/000103, filed 17 Feb. 2005, now Publication No. WO 2005/079588, which designated the U.S. and was published in the English language, and which claims priority from Danish patent application No. PA 2004 00269, filed 20 Feb. 2004, both herein incorporated by reference.

The present invention relates to a method for portion cutting of items, such as food products, said method comprising the steps of placing the items on conveying means, transporting said items to scanning means and from said scanning means to cutting means on the conveying means, detecting at least one characteristic of each item with said scanning means, sectioning the products using said cutting means, and controlling and regulating at least one cutting process parameter in order to achieve predetermined portions based on said detected item characteristic. The invention further relates to an apparatus for performing such method.

A portion cutting method and machine is known from U.S. Pat. No. 4,557,019. The method and machine described therein concerns the scanning of incoming items and subsequently cutting the items into portions.

In Danish utility model no. DK 96 00164 U3, an apparatus for portion cutting of food products is described, which comprises a rotatable cutting unit for sectioning the successive, mutually spaced products, which are guided through the cutting unit by a first and second conveyor respectively. A vision system for detecting the geometry of the items is arranged by the first conveyor. The shape of the products is registered in a control system controlling the machine for portion cutting the products into a predetermined weight, length, or size based on the shape of the products, and controlling the conveying velocity of the first conveyor.

In order to ensure a uniform cutting of the products in predetermined portion types or sizes, it is important that the products do not move on the conveyor, especially in the conveying direction, once the shape of the item is registered by the vision system. This would cause the subsequent cutting to become imprecise. In connection to the apparatus according to DK 96 00164 U3, a holder for retaining the products during cutting is described.

The items are guided on a conveyor and measured in a vision system. Based on registered item shape, average density of the item and the conveyor velocity, the cutting rate of the cutting unit is controlled, so that the portions or slices become uniform or in a predetermined size, so long as no relative movement between the items and the conveyor occurs between the vision system and the cutting unit, and particularly during cutting.

In particular for some food products it is a problem to handle the item on the conveyor, e.g. if it from the shape of the item and/or the texture follows that the item may easily roll or otherwise move on the conveyor, particularly when rolling or moving during cutting. This results in an imprecise portion cutting. In order to decrease this problem, it has been suggested to use holding means that act on top of the product which gently presses the product against the conveyor surface as it is being cut, so that the product does not move during the cutting. However, this holding means may cause the product to be slightly disfigured compared to the scanned shape of the product on which the cutting action is based, again resulting in imprecise portion cutting.

This kind of apparatus is generally referred to as a portion cutter, which is a machine cutting larger items into smaller items, so-called portions. The most popular products to be cut in this way are meat, poultry and fish. The portions are of predetermined size, length, volume or weight.

In the following, the process will be explained according to cutting into predetermined weight size portions, as this is the most complex process.

The items to be cut are placed on a conveyor which in turn takes the items to a measuring device, a cutting device and finally takes the portions out of the machine.

The measuring device is normally a computer vision or scanning device and a control unit which based on the known conveyor velocity calculates the shape of the items. The shape will be calculated as a curve expressing the accumulated volume (Y axis) by distance (X axis) from the first end of the item. The density (i.e. the weight to volume ratio) of the product has to be known. If it is not, the item has to be weighed prior to the scanning. The shape curve can now be converted into a weight curve and the cutting positions can be calculated by the control unit by finding the corresponding distances from the first end of the item to the weight of the portions.

The cutting device is often a rotating knife controlled to cut at the calculated positions. This knife can either be of a type working on top of the conveyor belt or a sword type meaning that the conveyor has to be split into two end-to-end placed conveyors to let the sword pass through the gab between the conveyors. Other cutting devices could be band saw, disc saw etc. or a drop knife, ultra sound cutting, water jet cutting or laser cutting, just as well as knives with different shapes may be used dependent of the particular task.

To obtain this individual curve for each item to be cut it is necessary to make a space at each end of the items when they are fed into the machine.

This space causes two main disadvantages. Firstly, the efficiency of the machine is reduced as it takes time to convey the spaces between the items through the machine, and secondly, the items can move while they are being cut, especially when cutting close to the rear end of the item as the item easily can tilt when it is short, resulting in imprecise cutting.

From U.S. Pat. No. 6,407,818, it is known to control the machine in order to compensate for a predetermined item movement on the conveyor, by bringing the items together after scanning, e.g. as in U.S. Pat. No. 6,407,818 by the use of a slower moving conveyor after scanning. However, this decreases both capacity and speed.

On this background, it is the object of the present invention to provide a method and apparatus of the initially mentioned kind wherein movement between the items and the conveyor is prevented, during and after scanning and during cutting in order to achieve a more precise portioning of products during cutting. Another object of the present invention may be to provide a method and an apparatus wherein the capacity of the apparatus may be optimised.

These objects are achieved by a method of the initially mentioned kind and an apparatus carrying out said method, wherein said products are placed consecutively and essentially abutting each other on said conveying means.

The above-mentioned disadvantages can be overcome by this invention where the items are positioned abutting each other.

The invention is advantageous with regard to capacity as the items to be cut may fill the conveyor completely. Thereby efficiency of the machine cannot be higher with respect to a given conveying velocity.

Another advantage of a method and apparatus according to the invention is that the items to be cut are unable to move when the subsequent item to be cut is supporting the rear end of it. To avoid the item from tilting in the forward direction it is already known to let the cut portions stay close together without accelerating the conveyor speed until they are in safe distance. This means the cut portions support the uncut piece of the item to be cut avoiding this to tilt in the forward direction.

In an associated aspect of the invention, the method and apparatus is related to being able to find the item boundary between consecutive items to be cut when they are placed on the conveyor abutting each other without any gab between them. Accordingly, in the preferred embodiment of the present invention, the controlling means comprises item boundary detection between items based on at least one measured item characteristic. Hereby, the scanning of items to be cut may be performed without having to have the items spaced apart, contrary to the scanning techniques known in the prior art.

In an embodiment of the invention, a second computer vision scanning function may be added either by adding a second computer vision system or adding the function in the already described scanning system. The function being finding at least one characteristic feature longitudinally according to the items to be cut and identifying a significant shift in this at least one feature. Thus, the present invention may be implemented on an existing portion cutter machine in order to enhance its performance.

Depending on the type of measuring means and type of items, the item boundary detection may be adapted to fit with the actual requirements. Accordingly, the item boundary detection may detect the transition between two adjacent, abutting items on the conveyor by performing relevant data processing of predetermined item characteristics measured by the scanning system or other suitable measuring means.

In the preferred embodiment of the present invention, the item boundary detection includes the steps of receiving successive item data sets from the at least one measured item characteristic, calculating the summary differences between two successive data set being the sum of the differences between a first data set and a second data set, and identifying the calculated summary differences exceeding a predetermined threshold, the identified summary differences representing a location of one point of transition between two items. Hereby, an efficient item boundary detection may be carried out for the purpose of planning the subsequent cutting of the items. According to this item boundary detection, a sudden change in a characteristic of the items, e.g. the height of the items, the surface texture, etc., is indicative of a new item passing through the measuring means.

The calculation of these data sets may comprise identifying the summary difference between two data sets, comprising for instance distance data from one or more sensors in the measuring means, which is obtained by $$\Sigma\Delta = |\Delta 1| + |\Delta 2| + |\Delta 3| + \ldots + |\Delta n|,$$

where $\Sigma\Delta$ is the summary difference, $\Delta 1$ is the difference between a first distance data and a successive second distance data from the first sensor in the measuring means, and 'n' is the number of sensors.

According to an embodiment of the present invention, the item boundary detection calculates the summary difference between two data sets, comprising for instance distance data from several sensors in the scanning means, which is obtained by $$\Sigma\Delta = |\Delta 1/a| + |\Delta 2/a| + |\Delta 3/a| + \ldots + |\Delta n/a|,$$

where $\Sigma\Delta$ is the summary difference, $\Delta 1$ is the difference between a first distance data and a successive second distance data from a first sensor in the measuring means, 'n' is the number of sensors and 'a' is the length between the location of the first set of distance data and the location of the second set of distance data. Hereby, an accurate item boundary detection of the transition point between two consecutive items may be provided, which is relatively independent of dimensional variations along the product.

In an embodiment of the present invention each of the items are mutually displaced relative to the longitudinal direction of the abutting products. This eases the calculation of a high summary difference in the transition point between the items on the conveyor.

In an alternative embodiment of the present invention each of the items are mutually aligned with the longitudinal direction of the abutting products.

The conveying means may be a V-shaped conveyor. In particular, for items with irregular shape, this prevents relative movement of the items on the conveyor means.

The measuring means is a scanning device, preferably a ring scanner, wherein the at least one measured item characteristic for use in the item boundary detection may be the height of the items. A ring scanner is a scanner measuring the shape of a product by using a number of distance sensors arranged so that they are surrounding the product and measuring substantially perpendicular to the conveyor direction. The sensors may be fixed or oscillating around the product. The advantage of this is that the provision of a full 360 degrees product contour data set, with full coverage of both floppy and firm product types. A ring scanner is moreover advantageous for item boundary detection, since dimples or otherwise concave item contours may be detected by this type of scanning, as the risk is reduced of shadowing the light beams between the light source and the sensors. However, it is realised that other measuring systems may be used, and the measuring means may include detecting in surface texture and/or colour and identifying changes therein in addition to or as an alternative to the dimensional measurements. For instance, a so-called flat scanner may be used.

In a so-called flat scanner, at least one light source is arranged to emit at least one line across the conveyor and the items at an angle and the reflected light is detected by sensor means arranged at an angle, typically at an angle of approx. 30°, between the emitted and the reflected light beams. This is a simple item scanning to determine the outer contour of the items, but for some items, in particular if the items are of irregular shape, surface contours on an item shadows parts of the line which results in a false projection in the camera. This may be avoided by a ring scanner, where a number of the light sources each emits a narrow beam towards the item from which the beam is reflected and recorded by a sensor arranged adjacent the light source. The sources and associated sensors are arranged in an annular configuration, e.g. with 24 light sources having 24 sensors in between. The light may be IR light, visible light, UV-light or laser light.

The method and apparatus according to the invention may further include weighing the items before the measuring. Hereby, the control means are allowed to compensate for density differences. The scanning means and/or control means may in advance be provided with information concerning at least an approximate location of transition points. Also, the weighing is conveniently provided in order to provide information to the control means concerning the density of an item.

In another embodiment of the present invention, a transition marker may be inserted between items. Said transition marker may provide the only or additional information concerning the transition point to be marked and thereby facilitate the item boundary detection. In this case, the determination of transition point is performed by the scanning means in a conventional way or by other detection means adapted to detect the transition marker.

Other embodiments of the present invention are disclosed in the accompanying claims.

In the following, the method and apparatus according to the invention will be described, by way of reference to some preferred embodiments, with reference to the schematic drawings in which FIG. 1 is a perspective view of a portion cutter embodying the invention;

Figure 1:
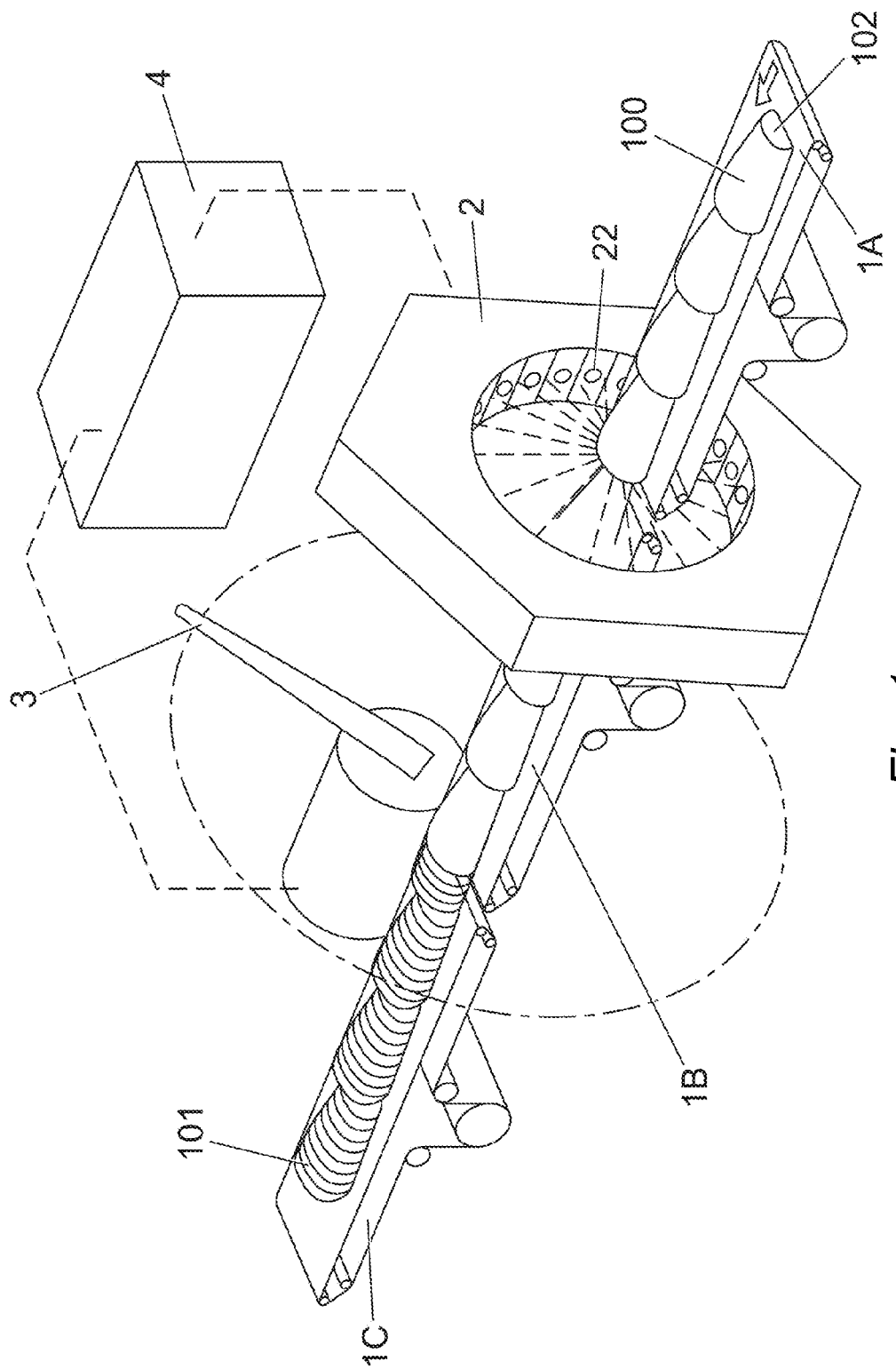
Figure 2A:
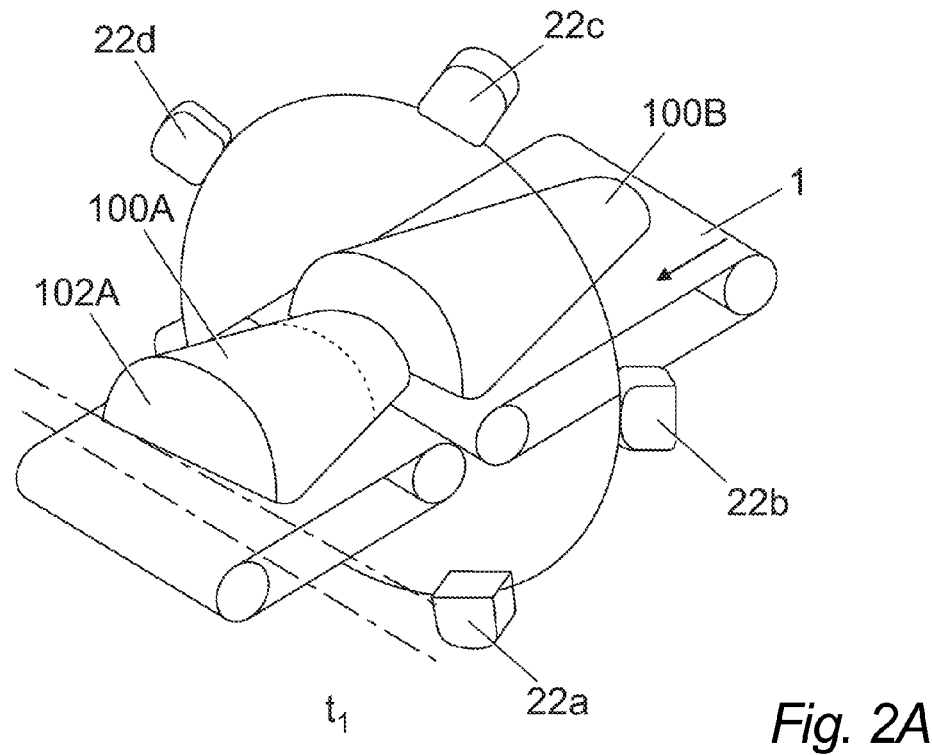
FIG. 2A, 2B are schematic perspective views of items being scanned by measuring means at time $t_1$ and $t_2$, respectively, for item boundary detection.
Figure 2B:
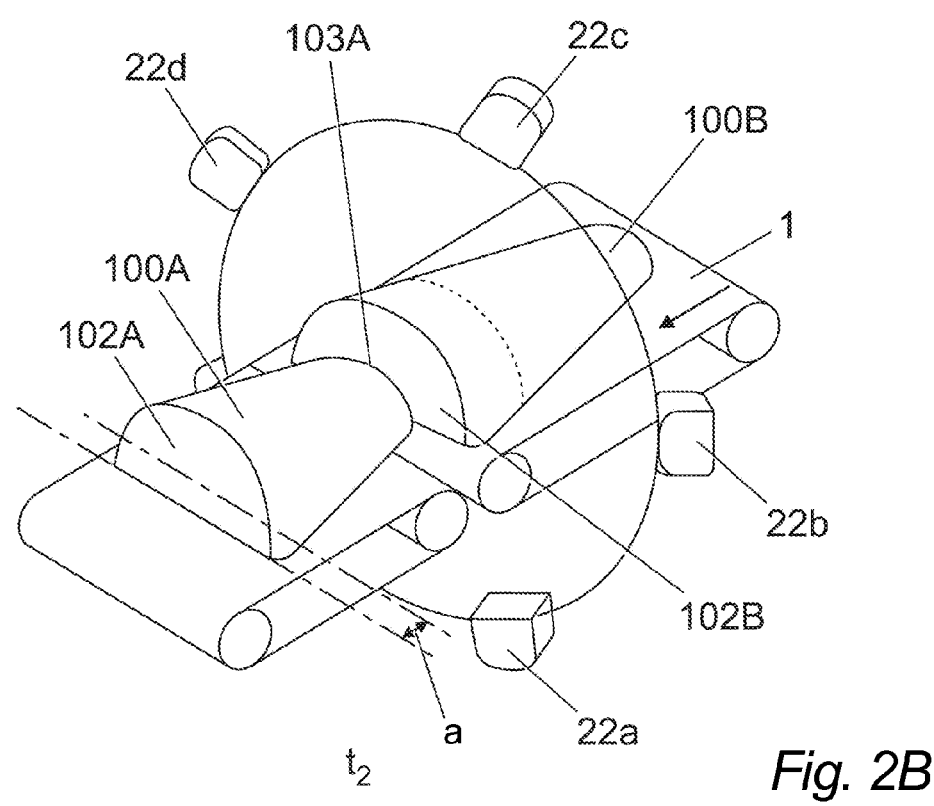

FIG. 1 shows a portion cutter for carrying out the method according to the present invention, in which the items 100 are placed consecutively and abutting each other on conveying means 1, in this case a first conveyor 1A, transporting the items 100 along the conveying direction indicated with a full arrow and preferably comprising weighing means (not shown) for performing a density estimate of the items 100. The items 100 are transported by the conveying means 1 towards measuring means 2, in the embodiment shown a ring scanner, in which characteristics of the item 100 is detected, which in the embodiments shown in FIGS. 2A, 2B, 3 and 5 involves distance data from several distance sensors 22 placed in a ring around the conveying means 1 in a measuring plane for detecting the distance between item surface and sensor. The items 100 are transported through the measuring plane, in the embodiment shown over a relatively small clearance between the first and a second conveyor 1A, 1B in order to enable a 360° contour scanning by the ring scanner. The items 100 are then transported onwards to cutting means 3, in the embodiment shown a rotatable sword-type cutter unit, the cutting of which is controlled by controlling and regulating means 4, which is described in more detail below, based on said detected characteristics from the scanning means 2, the position data for the scanning of the item on the conveyors and the density of the item. The items are accordingly cut into portions 101 of a predetermined weight, length or size. The cutting has been enabled by providing a clearance between the second 1B, and a third conveyor 1C, respectively.

In FIG. 1 is indicated the method according to the invention comprising products 100 being placed consecutively and abutting each other on the conveying means 1. Consequently, the items 100 are supporting and fixing each other during transport on the conveying means 1, and during cutting by the cutting means 3. The items 100, preferably food products like fish, poultry, pork or beef meat products, may be pre-cut and/or pre-skinned pieces, or may be entire pieces, and may as such be of different sizes, shapes and densities, and may contain fat, bone, meat and/or ligaments. Also, the items 100 may be of varying consistency, floppy, delicate, firm, hard, soft, thick, thin, or combinations of these. When the items 100 are being placed abutting each other, they provide support and fixation of each other in a smaller or larger degree depending on meat type, pre-cut shape, and size and shape of the abutting end surfaces of two products placed consecutively and abutting on the conveying means 1.

The placing means (not shown) may simply be another conveyor in communication with said first conveyor, e.g. from a pre-cutting device in the production line, or may be performed by manual feeding or by any other conventional placing device. The way the items are placed on the conveyor influence the most efficient manner in which the item boundary detection determines the transition point between the consecutive items.

Figure 3:
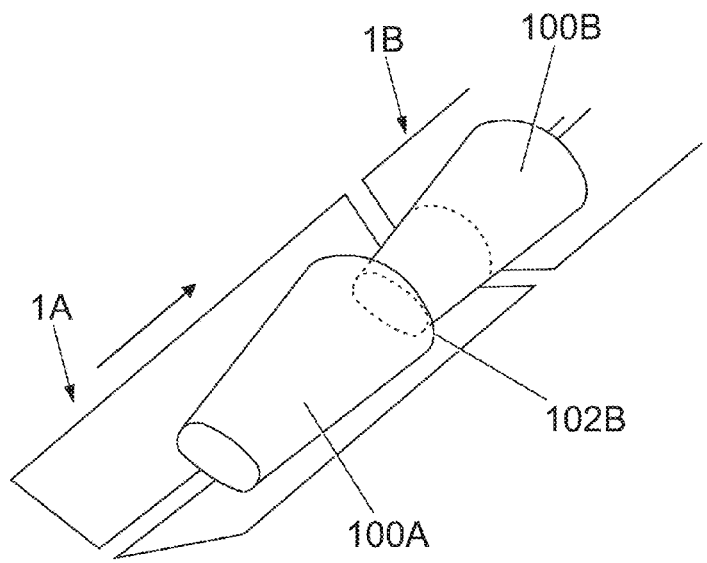
FIG. 3 is a schematic view of the invention, where the items are aligned on a V-shaped conveyor.
Figure 5:
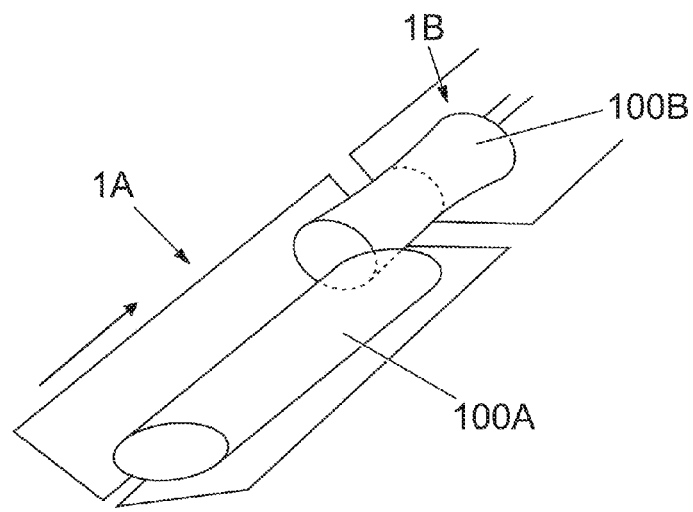
FIG. 5 is a schematic view of the invention, where the items are relatively displaced sidewardly on a V-shaped conveyor.

The conveying means may be any type of conventional conveying means, often several conveyors in a series, and preferably communicating with further conveyors in a production line from the inlet of the first conveyor 1A over the second conveyor 1B to the outlet end on the third conveyor 1C, as shown in FIG. 1. The conventional conveyors may for example comprise unidirectional conveyors, linearly directed conveyors (see FIGS. 1, 2A and 2B) and V-shaped conveyors (as shown in FIGS. 3 and 5). Advantageously, weighing means may be provided before the first conveyor 1A in order to establish data concerning item density for use by said controlling and regulating means 4.

The portion cutter is operated under the control of a controlling and regulating means 4, often a control circuit or processor, and the scanning means 2 supplies the control and regulating means 4 for the cutting means 3 with data, usually with data concerning the contour of the item 100 to be cut, in the embodiment shown being distance data from a ring scanner. In an advantageous embodiment of the invention, the scanning means also supplies data concerning the transition points between abutting items. The cutting means is in this embodiment a rotatable sword-type knife, but may be other conventional cutting means.

In FIG. 1, the ring scanner 2 produces data sets concerning the contour of said product by a detection of the distance from each of the sensors to each their corresponding points on the surface of the item, by correlation of a calibration distance to a reference point. Said data sets may, referring to FIG. 2A, for example comprise a first distance data set $d1_1, d1_2, d1_3, \ldots, d1_n$, acquired from n sensors 22a, 22b, ..., 22n in one position of the item 100 being scanned at time $t_1$, and referring to FIG. 2B a second distance data set $d2_1, d2_2, d2_3, \ldots, d2_n$, acquired from the same sensors in a second position of the item 100 being scanned at time $t_2$. As may be seen from the FIGS. 2A and 2B, the front end surface 102A, 102B of each item 100A, 100B may advantageously be pre-cut perpendicular to the conveying direction (indicated by arrows) and may be of a larger cross section area than the rear end surface 103A of each item, thereby enhancing the supporting effect of the abutting items facilitating an accurate determination of the point of transition between two items 100.

Figure 6:
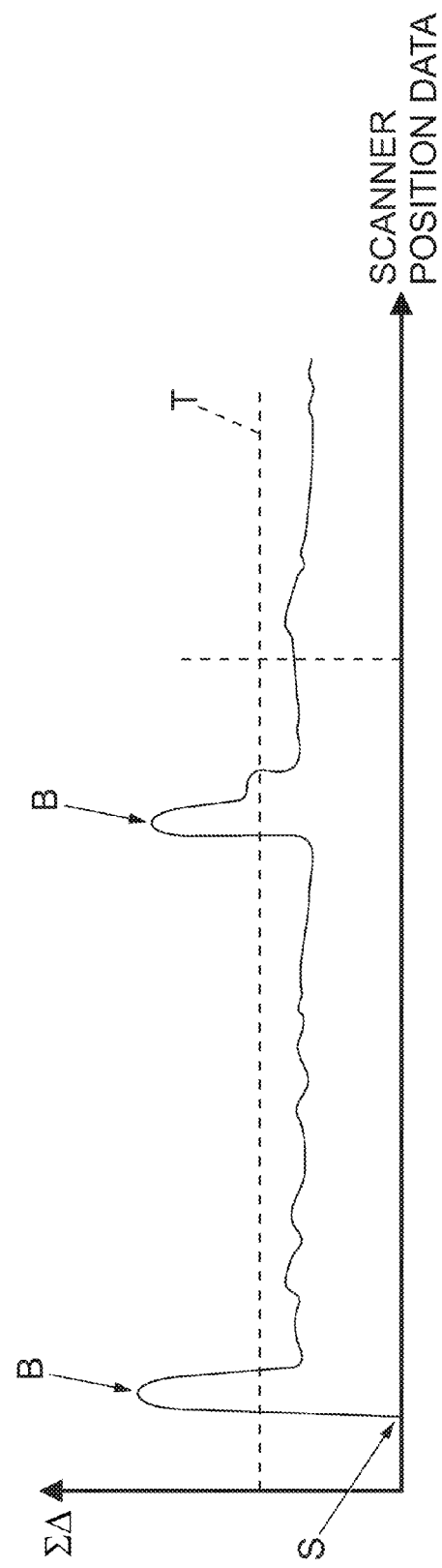
FIG. 6 is a diagram showing the measured data for the item boundary detection.
Figure 7:
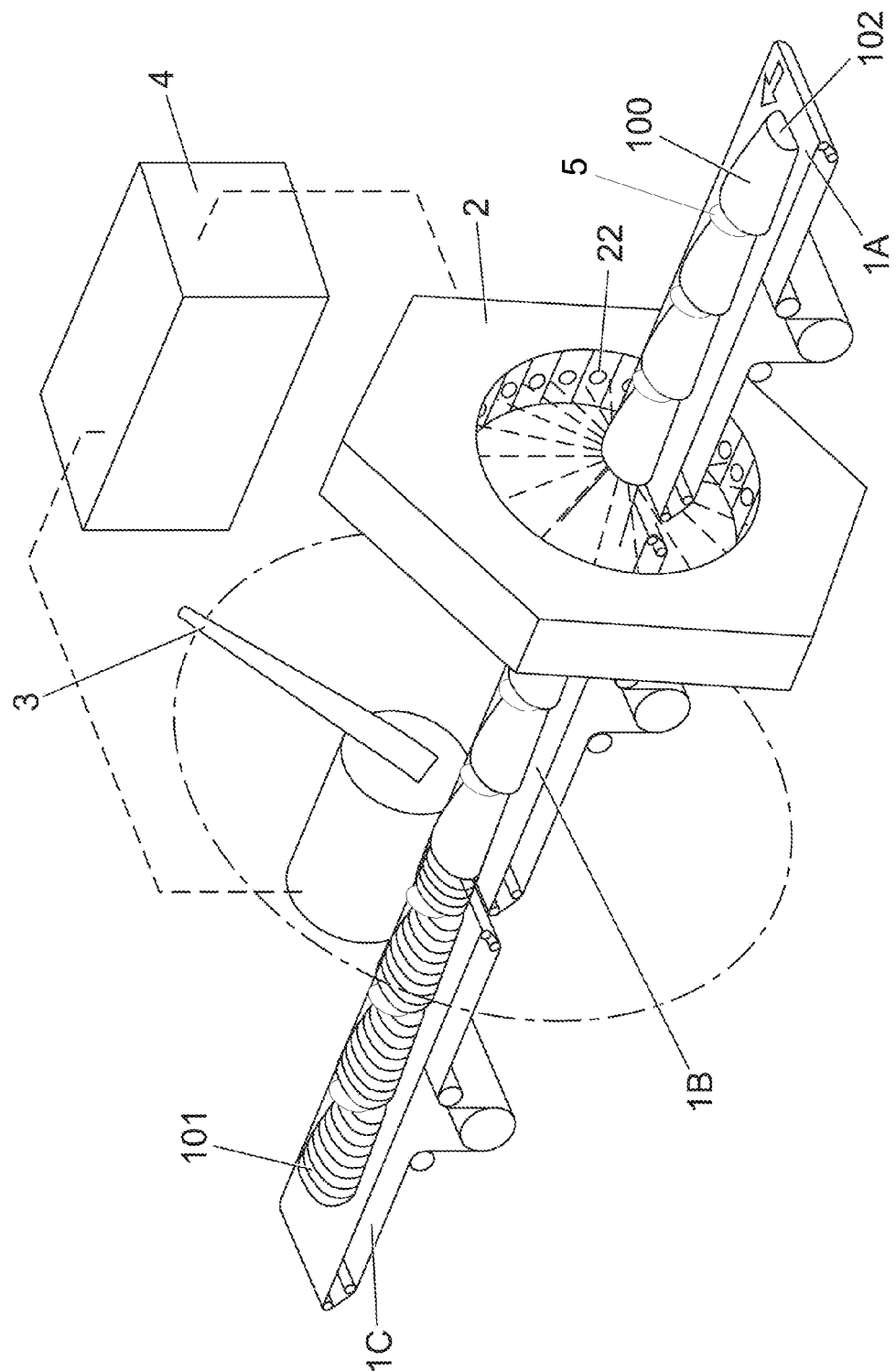
FIG. 7 is a perspective view of a portion cutter using boundary markers embodying another aspect of the invention.

In an advantageous embodiment of the present invention, transition points between items may be determined by providing successive item data sets from the at least one detected item characteristic from the scanning means, calculating the summary differences between two successive data sets being the sum of the differences between a first data set and a second data set, and determining the location of one point of transition between two items being where one of the calculated summary differences exceeds a predetermined threshold. The correlation between the summary difference and the scanning position data is shown in FIG. 6.

The portion cutter advantageously obtains the summary difference between two data sets, comprising distance data from several sensors in the scanning means, by the following formula $$\Sigma\Delta = |\Delta 1/a| + |\Delta 2/a| + |\Delta 3/a| + \ldots + |\Delta n/a|,$$

where $\Sigma\Delta$ is the summary difference, $\Delta 1$ is the difference between a first distance data and a successive second distance data from a first sensor in the scanning means, 'n' is the number of sensors in the scanning means, and 'a' is the length between the location of the first set of distance data and the location of the second set of distance data.

$\Sigma\Delta$ (which is not necessarily a measure for differences in the cross section area) is used in the determination of the transition point between two items 100, since $\Sigma\Delta$ along each item 100 is smaller than $\Sigma\Delta$ in the transition point. By having obtained information concerning the item characteristics like type of meat product, type of cut, item consistency and the like, a threshold T for $\Sigma\Delta$ may be established and set in the portion cutter according to the present invention (see FIG. 6). The measurement of the first item in the continuous row starts at the indication S in the FIG. 6. When $\Sigma\Delta$ exceeds the threshold T, the point of transition is determined in relation to that conveyor position, in which the greatest $\Sigma\Delta$ was found inside a predetermined distance from the location in which the $\Sigma\Delta$ exceeded the threshold T (see FIG. 6). These top points B indicate the item boundaries in the continuous flow of closely packed items on the conveyor.

If the items are weighted before the measuring, the approximate locations of the transition points are known and then there is no need for knowing the threshold T in order to determine the boundary between two abutting items on the conveyor.

In the FIGS. 1, 2A, 2B, and 3, the items have been placed consecutively and abutting each other, and have been mutually aligned with the longitudinal direction of the abutting items, i.e. put on a straight line. Alternatively, if the conveyor arrangement allows this, the items may optionally not be mutually aligned with the longitudinal direction of the abutting items. An example of this items arrangement on the conveyor is shown in FIG. 5. This approach provides for a calculation of a particularly high $\Sigma\Delta$.

If the items 100 are being pre-cut essentially perpendicular to the conveying direction with end surfaces 102 of essentially of the same shape and size, this provides good support for the adjacent items 100 during cutting in the cutting unit 3, although the item boundary may be less visible for the item boundary detection system. If each of the two item end surfaces are cut to approximately same size and shape as the end surfaces of the abutting items, this results in that the scanned data for the two items contain approximately the same distance data set. In this case, the determination of the transition point may be facilitated by placing the items 100 either not mutually aligned or with at least one of the end surfaces at an angle with the normal to the conveying direction, e.g. as shown in FIG. 5.

When scanning flexible items, which have either been pre-cut perpendicular to the conveying direction or been placed with the end surface perpendicular to the conveying direction, and the items have relatively uniform end surface cross section area and shape, a placing of such items or at least one end surface of each such item at an angle with the normal to the conveying direction advantageously facilitates the determination of the point of transition by providing a relatively large $\Sigma\Delta$ at the transition point.

In cases where items are having a cross section of a regular and in terms of size uniform shape, such as e.g. a fixed size circular, triangular, or rectangular cross section, and each item having an end surface obtained by said item being pre-cut perpendicular to the longitudinal axis of the item, it eases determination of the transition point to place said items on the conveying means with an end surface thereof at an angle to the normal of the conveying direction, as this placement approach leads to a calculation of as high a $\Sigma\Delta$ as possible.

Transition markers 5 may alternatively or additionally be used in order to provide data concerning the item boundaries to the scanning means, such transition marker could be e.g. a foil or a specially formed disc used as an insert marker between two items, where the marker is kept in place by the abutment of two products. The placing of the marker may e.g. be performed automatically or manually, and at the same time as the items are placed on the conveying means or after.

The invention may be exemplified by the following:

The scanning rate is 50 Hz.

The conveyor speed is 150 mm/s

This gives 3 mm between the scans

The height of the item in a given distance from the side edge of the conveyor is e.g. 20 mm At the next scan 3 mm down the item at the same distance from the side edge of the conveyor the height is 22 mm This gives a change value C (rate of change): $C = |(22-20)/3| = 0.67$ Now a number of such lines parallel to each other and parallel to the conveyor at different distances from the side edge of the conveyor are established and measured.

The total shift can be found by adding the change values in these lines:

$$\Sigma C = C_1 + C_2 + C_3 + \ldots + C_n$$

The value of $\Sigma C$ indicating the boundary between consecutive items is easily found by experience and can be memorised in the machine together with other characteristic values for a specific type of item.

Other characteristic features can be used instead of the heights or in addition to the heights.

Figure 4:
FIG. 4 is a schematic top view of items having different surface textures.

Other such features can e.g. be the colour of the items to be cut, the light reflection factors or a combination of these two and others (see FIG. 4).

Also, the height can be used in different ways. Above relative change is used (see FIGS. 3, 5 and 6). This can be with or without sign. True absolute change and relative change to scanline distance have been found to have good performance.

In the above example, the boundary detection calculations are explained with reference to scan data from a flat scanning device. However, in most applications, it is realised that a ring scanner is preferred. A ring scanner is a scanner measuring the shape of a product by using a number of distance sensors arranged so that they are surrounding the product and measuring substantially perpendicular to the conveyor direction. The sensors may be fixed or oscillating around the product. Measurements from such a device can be used in the same way as described above. The "height measurements" in relation to a ring scanner is the distance from the surface of the item to the sensors.

In relation to a flat scanning device a number of lines may be identified and utilised analogously as the measurements in a ring scanner, so that the boundary can be detected in the same manner in a "flat" scanner as in a ring scanner.

In an embodiment of the invention, a second computer vision scanning function may be added to an existing portion cutter either by adding a second computer vision system or adding the function in the already present scanning system; the function being finding at least one characteristic feature longitudinally according to the items to be cut and identifying a significant shift in this at least one feature. This can be measuring the height of the items in a number of longitudinal lines. When there is a significant shift this indicates the boundary between consecutive items meaning the end of one item and the beginning of the next one. This can be practised by finding the relative shift in height from scan line to scan line in a number of lines and adding these relative numbers (see FIG. 6).

When referring to a sensor in this description, any type of sensor is meant. The sensor can be any device capable of detecting a characteristic of a surface, in particular an illuminated point, line or other kind of shapes on the surface of the item which is being scanned.

The invention is described above with reference to some preferred embodiments. However, it is realised that many variations and equivalent embodiments of the invention may be carried out without departing from the scope of the accompanying claims. For instance, a number of flat scanners may be arranged in an annular formation forming a ring scanner.

What is claimed is:

1. A method for cutting of items into portions of predetermined size, said method comprising the steps of:
   placing the items on a conveying means;
   transporting the items to a measuring means;
   transporting the items from the measuring means to a cutting means on the conveying means;
   measuring a plurality of successive data sets each comprising a plurality of at least one characteristic of each item measured with the measuring means, with said successive data sets being taken at intervals across a length of said items;
   sectioning the items by the cutting means; and
   controlling and regulating at least one cutting process parameter in order to achieve predetermined product portions from the items based on the measured at least one characteristic;
   wherein
   said items are placed consecutively and substantially abutting each other on said conveying means such that said items are in direct physical contact with each other, and wherein
   the controlling step includes an item boundary detection step, such that a point of transition between consecutive items on the conveyor means is determined based on the at least one measured item characteristic, and further wherein
   the item boundary detection step includes the steps of:
      comparing prior data sets with subsequent data sets to determine a difference between successive data sets, and
      analyzing said difference between successive data sets for comparison against a threshold for identifying the boundary between the consecutively abutting items, wherein said boundary is determined when said difference is greater than said threshold.

2. The method according to claim 1, wherein said at least one characteristic includes a distance of a point on the surface of each one of said items from a reference point, and wherein the item boundary detection step includes the steps of:
   determining said difference by calculating summary differences between said distances provided in two successive data sets, said summary differences being the sum of the differences between a first of the successive data sets and a second of the successive data sets; and
   identifying any of the summary differences that exceed a predetermined threshold, said identified summary differences representing a location of one point of the transition between two items.

3. The method according to claim 2, wherein the controlling step utilizes the summary difference, the summary difference being obtained from distance data from a plurality sensors in the measuring means according to:

$$\Sigma\Delta = |\Delta 1/a| + |\Delta 2/a| + |\Delta 3/a| + \ldots + |\Delta n/a|,$$

where $\Sigma\Delta$ is the summary difference, $\Delta 1$ is the difference between a first distance data and a successive second distance data from the first sensor in the measuring means, 'n' is the number of sensors, and 'a' is the length between the location of the first set of distance data and the location of the second set of distance data.

4. The method according to claim 1, wherein the measuring means includes a scanning device.

5. The method of claim 4, wherein the scanning device includes a ring scanner.

6. The method according to claim 1, wherein the measuring means include a scanning device, and wherein at least one light source is arranged to emit at least one line of light towards the item(s) being scanned and the reflected light is detected by a sensor means arranged at an acute angle between the emitted and the reflected light beams.

7. The method according to claim 6, wherein the angle is about 30°.

8. The method according to claim 6, wherein the controlling step includes the step of organizing the measurements for defining at least one list of item characteristics representing a line characteristic along the items on the conveyor and calculating the summary difference between two data sets in said list, with the summary difference being obtained by:

$$\Sigma\Delta = |\Delta 1/a| + |\Delta 2/a| + |\Delta 3/a| + \ldots + |\Delta n/a|,$$

where $\Sigma\Delta$ is the summary difference, $\Delta 1$ is the difference between a first data set and a successive second data set in the item characteristics, 'n' is the number of data sets, and 'a' is the length between the location of the first data set and the location of the second data set.

9. The method according to claim 1, wherein the at least one measured item characteristic is the height of the items.

10. The method according to claim 1, wherein the items are aligned with the longitudinal direction of the substantially abutting items.

11. The method according to claim 1, wherein the items are mutually displaced relative to the longitudinal direction of the substantially abutting items.

12. The method according to claim 1, wherein the conveying means includes a V-shaped conveyor.

13. The method according to claim 1, further comprising the step of weighing the items before the measuring.

14. The method according to claim 1, wherein a transition marker between items is inserted.

15. The method according to claim 1, wherein the item data sets are data sets measured practically across the item transversely to the transportation direction.

16. The method according to claim 15, wherein the item data sets measured practically across the item transversely to the transportation direction are organized in lists representing item characteristics practically longitudinally to the transportation direction.

17. The method according to claim 16, wherein the summary differences between two data sets, comprising data from one or more lists, are obtained by:

$$\Sigma\Delta = |\Delta 1| + |\Delta 2| + |\Delta 3| + \ldots + |\Delta n|,$$

where $\Sigma\Delta$ is the summary difference, $\Delta 1$ is a difference between a first data set and a successive second data set in the item characteristics, and 'n' is a number of data sets.

18. The method according to claim 1, wherein the data sets comprise distances in relation to a reference point, said distances being measured by means of one or more sensors located at fixed positions.

19. The method according to claim 1, wherein the data sets comprise colors measured by one or more sensors.

20. The method according to claim 1, wherein the data sets comprise textures measured by one or more sensors.

21. An apparatus for portion cutting of items, said apparatus comprising conveying means for transporting items placed on said conveying means to measuring means and onwards to cutting means for sectioning the items into portions; and control means for controlling and regulating at least one cutting process parameter in order to achieve predetermined item portions based on the measured at least one characteristic;

wherein said measuring means is adapted for measuring a plurality of successive data sets each comprised of a plurality of data points of at least one characteristic of each item measured with the measuring means, with said successive data sets being taken at intervals across a length of each of said items, and wherein said items are placed consecutively and essentially abutting each other on said conveying means such that said items are in direct physical contact with each other, and wherein the control means includes item boundary detection means for determining the point of transition between two items based on said at least one measured item characteristic, and wherein the item boundary detection means includes:

means for receiving successive item data sets from the at least one measured item characteristic; and means for analyzing the received data by comparing a prior data set with a subsequent data set to determine a difference between successive data sets for comparison against a threshold value for identifying the boundaries between the consecutively abutting items, wherein said boundary is determined when said difference is greater than said threshold value.

22. The apparatus according to claim 21, wherein the control means include item boundary detection means, and wherein said at least one characteristic includes a distance of at least one point on the surface of each one of said items from a reference point, and wherein successive product data sets are provided from the at least one detected item characteristic, the summary differences between two successive data set are calculated as being the sum of the differences between the distance(s) of a first data set and the distance(s) of a second data set, and at least one point of transition between two items is located by identifying the calculated summary differences exceeding a predetermined threshold.

23. An apparatus according to claim 22, wherein the control means are provided with the summary difference between two data sets, comprising distance data from a plurality of sensors in the measuring means by $$\Sigma\Delta=|\Delta 1/a|+|\Delta 2/a|+|\Delta 3/a|+\ldots+|\Delta n/a|,$$

where $\Sigma\Delta$ is the summary difference, $\Delta 1$ is the difference between a first distance data and a successive second distance data from a first sensor in the measuring means, 'n' is the number of sensors and 'a' is the length between the location of the first set of distance data and the location of the second set of distance data.

24. The apparatus according to claim 21, wherein the measuring means include a ring scanner.

25. The apparatus according to claim 21, wherein the measuring means include a scanning device, wherein at least one light source is arranged to emit at least one line of light towards the item and the reflected light is detected by sensor means arranged at an acute angle between the emitted and the sensor position.

26. The apparatus according to claim 25, wherein the angle is about 30°.

27. The apparatus according to claim 25, wherein the control means include means for organizing measurements for defining at least one list of item characteristics representing a line characteristic along the items on the conveyor and calculating a summary difference between two data sets in the list, said summary difference being obtained by:

$$\Sigma\Delta=|\Delta 1/a|+|\Delta 2/a|+|\Delta 3/a|+\ldots+|\Delta n/a|,$$

where $\Sigma\Delta$ is the summary difference, $\Delta 1$ is the difference between a first data set and a successive second data set in the item characteristics, 'n' is the number of data sets, and 'a' is the length between the location of the first data set and the location of the second data set.

28. The apparatus according to claim 21, where the conveying means includes a V-shaped conveyor.

29. The apparatus according to claim 21, wherein the apparatus includes weighing means for weighing the items.

30. The apparatus according to claim 21, wherein the apparatus includes means for inserting a transition marker between the items.

31. The apparatus according to claim 21, wherein the item data sets are data sets measured practically across the item transversely to the transportation direction.

32. The apparatus according to claim 31, wherein the item data sets are data measured practically across the item transversely to the transportation direction are organized in lists representing item characteristics practically longitudinally to the transportation direction.

33. The apparatus according to claim 32, wherein the control means are provided with the summary difference between two data sets, comprising data from one or more lists, according to:

$$\Sigma\Delta=|\Delta 1|+|\Delta 2|+|\Delta 3|+\ldots+|\Delta n|,$$

where $\Sigma\Delta$ is the summary difference, $\Delta 1$ is a difference between a first distance data and a successive second distance data from a sensor in the measuring means, and 'n' is the number of sensors in the measuring means.

34. The apparatus according to claim 21, wherein the measuring means for detecting at least one characteristic of the product comprises one or more sensors located at fixed positions for providing data sets representing distances in relation to a reference point.

35. The apparatus according to claim 21, wherein the measuring means for detecting at least one characteristic of the product comprises one or more sensors for detecting surface color.

36. The apparatus according to claim 21, wherein the measuring means for detecting at least one characteristic of the product comprises one or more sensors for detecting texture.

37. The apparatus according to claim 21, wherein the at least one measured item characteristic is the height of the items.

38. A method for cutting of items into portions of predetermined size, said method comprising the steps of:
- placing the items on a conveying means in a manner such that a subsequently placed item is placed on said conveying means next to a previously placed item without a gap between the previously placed item and the subsequently placed item;
- transporting the items to a measuring means;
- transporting the items from the measuring means to a cutting means on the conveying means;
- measuring a plurality of at least one characteristic of each item with the measuring means to form a data set, with successive data sets being taken at intervals across a length of each of said items;
- sectioning the items by the cutting means; and
- controlling and regulating at least one cutting process parameter in order to achieve predetermined product portions from the items based on the at least one measured item characteristic, wherein
- the controlling step includes an item boundary detection step such that a point of transition between consecutive items on the conveyor means having no gap therebetween is determined based on comparing differences between successive data sets with a predetermined threshold value, such that the boundary is determined where one of said differences is greater than said threshold value.

39. The method of claim 38, wherein the item boundary detection step includes the steps of:
- receiving successive item data sets of the measured at least one characteristic of successive items, and
- analyzing the received data for identifying the boundaries between the consecutively placed items.

40. The method according to claim 38, wherein the item boundary detection step includes the steps of:
- receiving successive item data sets of the at least one measured item characteristic of successive items;
- calculating summary differences between two successive data sets, said summary differences being the sum of the differences between a first of the successive data sets and a second of the successive data sets; and
- identifying any of the summary differences that exceed said predetermined threshold, said identified summary differences representing a location of one point of the transition between two items.

41. The method according to claim 38, wherein a transition marker is inserted between items prior to said item boundary detection step to support said item boundary detection step.

42. A method for cutting of items into portions of predetermined size, said method comprising the steps of:
- placing the items on a conveying means in a manner such that a subsequently placed item is placed on said conveying means next to, and in contact with, a previously placed item for transport to a cutting means to form a boundary;
- for each item, measuring a distance of a plurality of spaced points on a surface of said item with at least one reference point to form a data set of distances corresponding with the item, said measuring a distanced being performed at multiple locations along a length of said item to form a plurality of data sets;
- determining differences between the distances provided in previous data sets with subsequent data sets;
- determining the boundary between the previously placed item and the subsequently placed item by analyzing said differences for comparison to a threshold value, such that said boundary is determined at a location where the differences between consecutive data sets is greater than said threshold value; and
- sectioning the items by the cutting means for cutting said items, wherein said determined boundary is taken into account for said cutting.

43. The method according to claim 42, wherein the differences between subsequent data sets are calculated by determining a summary difference according to:

$$\Sigma\Delta = |\Delta 1| + |\Delta 2| + |\Delta 3| + \ldots + |\Delta n|,$$

where $\Sigma\Delta$ is the summary difference, $\Delta 1$ is a difference between first distance data in a first data set and a second distance data of a subsequent data set, and 'n' is the number of points of said plurality of spaced points.

44. The method according to claim 42, wherein the difference between the data sets is calculated by determining a summary difference according to:

$$\Sigma\Delta = |\Delta 1/a| + |\Delta 2/a| + |\Delta 3/a| + \ldots + |\Delta n/a|,$$

where $\Sigma\Delta$ is the summary difference, $\Delta 1$ is a difference between first distance data in a first data set and a second distance data of a subsequent data set, 'n' is the number of points of said plurality of spaced points, and 'a' is a length between the location of the first data set and the location of the second data set.

45. A method for cutting of items into portions of predetermined size, said method comprising the steps of:
- placing the items in direct physical contact with each other on a conveying means;
- transporting the items to a measuring means;
- measuring a plurality of successive data sets each comprised of a plurality of data points of at least one characteristic of each item measured with the measuring means, with said successive data sets being taken at intervals across a length of each of said items;
- performing an item boundary detection step to detect the boundary between consecutive items, comprising the steps of:
  - determining a difference between two data sets by comparing the data points of one data set with the data points of a prior or subsequent data set, and
  - analyzing said difference between the two data sets by comparison against a threshold value for identifying the boundary between the consecutive items, wherein said boundary is determined when said difference is greater than said threshold value;
- transporting the items from the measuring means to a cutting means on the conveying means; and
- sectioning the items by the cutting means in a manner to achieve predetermined product portions from the items based on both the measured at least one characteristic and the determined boundary between the consecutive items.

46. The method of claim 45, wherein said determining a difference between two data sets includes the step of summing the differences between the data points of one data set and the data points of a prior or subsequent data set.

47. The method according to claim 45, wherein the differences between subsequent data sets are calculated by determining a summary difference according to:

$$\Sigma\Delta = |\Delta 1| + |\Delta 2| + |\Delta 3| + \ldots + |\Delta n|,$$

where $\Sigma\Delta$ is the summary difference, $\Delta 1$ is a difference between first distance data in a first data set and a second distance data of a subsequent data set, and 'n' is the number of points of said plurality of spaced points.

48. The method according to claim 45, wherein the difference between the data sets is calculated by determining a summary difference according to:

$$\Sigma\Delta = |\Delta 1/a| + |\Delta 2/a| + |\Delta 3/a| + \ldots + |\Delta n/a|,$$

where $\Sigma\Delta$ is the summary difference, $\Delta 1$ is a difference between first distance data in a first data set and a second distance data of a subsequent data set, 'n' is the number of points of said plurality of spaced points, and 'a' is a length between the location of the first data set and the location of the second data set.

* * * * *